US008843067B2

(12) United States Patent
Nagoshi et al.

(10) Patent No.: US 8,843,067 B2
(45) Date of Patent: Sep. 23, 2014

(54) WIRELESS COMMUNICATIONS APPARATUS AND WIRELESS COMMUNICATIONS METHOD

(75) Inventors: Masahiko Nagoshi, Osaka (JP); Wataru Noguchi, Hyogo (JP); Hiroyuki Yurugi, Osaka (JP); Sotaro Shinkai, Osaka (JP); Akihiko Shiotsuki, Osaka (JP); Osamu Tanaka, Osaka (JP); Toyoshi Yamada, Osaka (JP); Nobuhiko Arashin, Osaka (JP)

(73) Assignee: Panasonic Corporation, Osaka (JP)

( * ) Notice: Subject to any disclaimer, the term of this patent is extended or adjusted under 35 U.S.C. 154(b) by 630 days.

(21) Appl. No.: 13/129,204

(22) PCT Filed: Nov. 17, 2009

(86) PCT No.: PCT/JP2009/006145
§ 371 (c)(1),
(2), (4) Date: May 13, 2011

(87) PCT Pub. No.: WO2010/055697
PCT Pub. Date: May 20, 2010

(65) Prior Publication Data
US 2011/0217933 A1 Sep. 8, 2011

(30) Foreign Application Priority Data

Nov. 17, 2008 (JP) ................. 2008-292946

(51) Int. Cl.
*H04B 7/00* (2006.01)
*H04N 5/782* (2006.01)
*H04N 5/765* (2006.01)

(52) U.S. Cl.
CPC ............. *H04N 5/782* (2013.01); *H04N 5/765* (2013.01)
USPC ..................................... 455/41.3

(58) Field of Classification Search
USPC ......................................... 455/41.3
See application file for complete search history.

(56) References Cited

U.S. PATENT DOCUMENTS

2004/0266457 A1* 12/2004 Dupray ............... 455/456.5
2008/0259199 A1* 10/2008 Sako et al. ............ 348/333.01
2008/0303956 A1 12/2008 Nakagawa

FOREIGN PATENT DOCUMENTS

JP 2000-209652 7/2000
JP 2003-152631 5/2003

(Continued)

OTHER PUBLICATIONS

Full Machine Translation of JP 2007-158471 previously cited in an IDS filed on May 13, 2011.

(Continued)

*Primary Examiner* — David Bilodeau
(74) *Attorney, Agent, or Firm* — Wenderoth, Lind & Ponack, L.L.P.

(57) ABSTRACT

A wireless communications apparatus (1) in the present invention transmits, via wireless communications, data recorded on a memory unit (13) to a recording apparatus (2). The wireless communications apparatus (1) includes: a communication area determining unit (19) determining whether or not the wireless communications apparatus (1) is in a communication area having a threshold value equal to MIDDLE or higher; a stillness detecting unit (15) detecting whether or not the wireless communications apparatus (1) remains still; and a wireless communications unit (17) starting to transmit, via the wireless communications, the data recorded on the memory unit (13) to the recording apparatus (2) in the case where (i) the communication area determining unit (19) determines that the wireless communications apparatus (1) is in the communication area having the threshold value equal to MIDDLE or higher, and (ii) the stillness detecting unit (15) detects that the wireless communications apparatus (1) remains still.

16 Claims, 9 Drawing Sheets

(56) References Cited

FOREIGN PATENT DOCUMENTS

| | | |
|---|---|---|
| JP | 2004-80421 | 3/2004 |
| JP | 2004-153515 | 5/2004 |
| JP | 2004-260714 | 9/2004 |
| JP | 2006-42104 | 2/2006 |
| JP | 2007-124577 | 5/2007 |
| JP | 2007-158471 | 6/2007 |
| JP | 2008-124652 | 5/2008 |
| JP | 2008-306687 | 12/2008 |

OTHER PUBLICATIONS

International Search Report issued Jan. 12, 2010 in International (PCT) Application No. PCT/JP2009/006145.

* cited by examiner

WIRELESS COMMUNICATIONS APPARATUS AND WIRELESS COMMUNICATIONS METHOD

TECHNICAL FIELD

The present invention relates to wireless communications apparatuses and wireless communication methods and, in particular, to a communication apparatus which transmits data recorded on a recording medium to another apparatus via wireless communications.

BACKGROUND ART

Film cameras take image information (photos) on film, and tape-based camcorders take video information (moving pictures) on a recording medium such as VHS video tapes. Recent years have seen audio-visual (AV) appliances rapidly digitalizing, and digital still cameras and digital camcorders use digital recording media including secure digital (SD) cards. Furthermore, the digitalized equipment uses different techniques to output recorded video and picture information.

When a user uses a film camera, the only approach to obtain finished photos is to have the film developed. Concurrently, a digital still camera can transfer recorded image data and save the data (hereinafter referred to as transfer and save) to recording apparatuses, including a personal computer and a hard disc drive (HDD) recorder, via a digital recording medium such as an SD card and a cable such as a universal serial bus (USB) cord. The digital still camera can also transfer recorded image data and display the data (hereinafter referred to as transfer and display) on a displaying apparatus such as a TV or a projector.

Via the SD card or the cable, a digital video camera can transfer and save the video and the picture data to a recorder or can transfer and display the video and the picture data on a TV.

As a technique to transfer the video and the picture data, the AV appliances utilize the wireless data transfer on Bluetooth or a wireless LAN. With a use of such a technique, more and more digital still cameras and digital camcorders with wireless LAN capabilities are on the market.

On the other hand, some wireless communications apparatuses, such as a notebook personal computer (PC), use a technique (See Patent Literature 1) to detect a motion of the wireless communications apparatus working as a source of data transmission, and suspend the data transmission when the wireless communications apparatus moves. In addition, the technique disclosed in PL 1 can suspend the data transfer only when the quality of service in wireless communications is poor, while the technique can continue the data transfer when the quality of service in wireless communications is good.

Hence the wireless communications apparatus disclosed in PL 1 suspends the wireless communication while transmitting data in the wireless data transfer. This makes possible preventing a failure of the file system of a recording apparatus at the destinations of the data.

CITATION LIST

Patent Literature

[PL 1]
 Japanese Unexamined Patent Application Publication No. 2007-158471

SUMMARY OF INVENTION

Technical Problem

The conventional wireless communications apparatus starts the wireless data transfer according to the user's operation. Specifically, the user has to choose a destination apparatus and data to be transferred.

Moreover, the technique disclosed in PL 1 is for notebook PCs. The notebook PC users are highly likely used to operating electronic appliances. Hence such users might not have troubles handling more or less complex operations for the data transfer.

On the other hand, there are a large number of users who own the AV appliances including digital still cameras and digital camcorders, and are not used to electronic appliances. For such users, simpler operations are desired in order for the users to transfer the wireless data.

Therefore, the present invention has as an object to introduce a wireless communications apparatus capable of data transfer via wireless communications with simple operations.

In order to achieve the above object, a wireless communications apparatus according to an aspect of the present invention transmits, via wireless communications, data recorded on a recording medium to one or more of other appliances. The wireless communications apparatus includes: a communication area determining unit which determines whether or not the wireless communications apparatus is in a predetermined communication area; a stillness detecting unit which detects whether or not the wireless communications apparatus remains still; and a wireless communications unit which starts to transmit, via the wireless communications, the data recorded on the recording medium to the other appliance in the case where (i) the communication area determining unit determines that the wireless communications apparatus is in the predetermined communication area, and (ii) the stillness detecting unit detects that the wireless communications apparatus remains still.

The wireless communications apparatus may further include an appliance determining unit which determines whether or not the other appliance is a designated appliance which has previously been designated. The wireless communications unit may start to transmit, via the wireless communications, the data recorded on the recording medium to the other appliance in the case where (i) the communication area determining unit determines that the wireless communications apparatus is in the predetermined communication area, (ii) the stillness detecting unit detects that the wireless communications apparatus remains still, and (iii) the appliance determining unit determines that the other appliance is the designated appliance.

In the case where there are two or more of the other appliances which can wirelessly communicate with the wireless communications apparatus, the communication area determining unit may determine, for each of the other appliances, whether or not the other appliance is in the predetermined communication area, the appliance determining unit may (i) determine, for each of the other appliances, whether or not the other appliance is the designated appliance, and, in the case where the other appliances include the designated appliances, (ii) determine, from among the other appliances which are the designated appliances, an appliance as an other appliance at a destination of data transmission, the appliance being determined by the communication area determining unit to be found in the predetermined communication area, and to be closest to the wireless communications apparatus, and the wireless communications unit may transmit the data recorded on the recording medium to the other appliance determined by the appliance determining unit as the destination of the data transmission.

The wireless communications apparatus may further include a starting switch to be operated by a user, wherein the wireless communications unit may start to transmit, via the wireless communications, the data recorded on the recording medium to the other appliance in the case where (i) the communication area determining unit determines that the wireless communications apparatus is in the predetermined communication area, (ii) the stillness detecting unit detects that the wireless communications apparatus remains still, and (iii) the starting switch is on.

The other appliance may be a displaying apparatus which displays the data transmitted from the wireless communications apparatus, the wireless communications apparatus may further include a list creating unit which creates a list of the data recorded on the recording medium, and in the case where (i) the communication area determining unit determines that the wireless communications apparatus is in the predetermined communication area, and (ii) the stillness detecting unit detects that the wireless communications apparatus remains still, the wireless communications unit may transmit the list to the displaying apparatus via the wireless communications, and to transmit data designated by the user to the displaying apparatus, the designated data being included in the data in the list.

The wireless communications unit may receive information transmitted from the displaying apparatus and indicating the data designated by the user, and to transmit the data indicated in the received information to the displaying apparatus.

The wireless communications apparatus may further include a list creating unit which creates a list of the data recorded on the recording medium; a displaying unit which displays the list in the case where (i) the communication area determining unit determines that the wireless communications apparatus is in the predetermined area, and (ii) the stillness detecting unit detects that the wireless communications apparatus remains still; and an input unit which receives an input operation of the user, wherein the wireless communications unit may transmit data designated by the user to the other appliance via the input unit, the designated data being included in the data in the list.

The wireless communications apparatus may include a control unit which (i) executes, while the wireless communications unit is transmitting the data, at least one of suspending the transmission and sending a warning to the user in the case where (a) the stillness detecting unit detects that the wireless communications apparatus is moving, and (b) the communication area determining unit determines that the wireless communications apparatus is in the predetermined communication area and out of a communication area smaller than the predetermined communication area; and (ii) avoids executing, while said wireless communications unit is transmitting the data, at least one of the suspending the transmission and the sending the warning to the user in the case where (a) the stillness detecting unit detects that the wireless communications apparatus is moving, and (b) the communication area determining unit determines that the wireless communications apparatus is in the communication area smaller than the predetermined communication area.

The communication area determining unit may determine a communication area using a Received Signal Strength Indicator (RSSI).

The communication area determining unit may determine a communication area using a Physical Layer (PHY) rate.

The communication area determining unit may determine a communication area using Packet Error Rate (PER).

The stillness detecting unit may determine stillness using an acceleration sensor.

The stillness detecting unit may include: a timer which obtains the RSSI at a predetermined time period using the RSSI; and a counter which obtains the RSSI for a predetermined number of times, and may detect stillness by determining whether or not a variation in an RSSI value in a predetermined period is within a predetermined range.

The stillness detecting unit may detect stillness by determining whether or not the user is touching the wireless communication apparatus using a touch sensor.

The stillness detecting unit may detect stillness, using a projection switch, by determining whether or not the projection switch is pressed.

In addition to be introduced as the wireless communications apparatus described above, the present invention may also be introduced as (i) a wireless communication method having characteristic units included in the wireless communications apparatus as steps, and (ii) a program which causes a computer to execute such characteristic steps. Such a program may be distributed through a recording medium such as a compact disc read only memory (CD-ROM), and a transmission medium such as the Internet.

Furthermore, the present invention may be introduced as a Large-Scale Integration (LSI) circuit having some or all of the functions of the wireless communications apparatus. In addition, the present invention may be introduced as a digital still camera and a digital camcorder which include the wireless communications apparatus.

Advantageous Effects of Invention

The present invention offers a wireless communications apparatus and a wireless communication method capable of data transfer via wireless communications with simple operations.

DESCRIPTION OF EMBODIMENTS

Described hereinafter are Embodiments of the present invention with reference to the drawings.

[Embodiment 1]

A wireless communications apparatus according to Embodiment 1 of the present invention starts wireless data transfer when the apparatus (i) is in a predetermined communication area, and (ii) remains still. Under such conditions, the wireless communications apparatus in the present invention can transfer data via wireless communications with simple operations.

Described first is a wireless communication system according to Embodiment 1 of the present invention.

Figure 1:
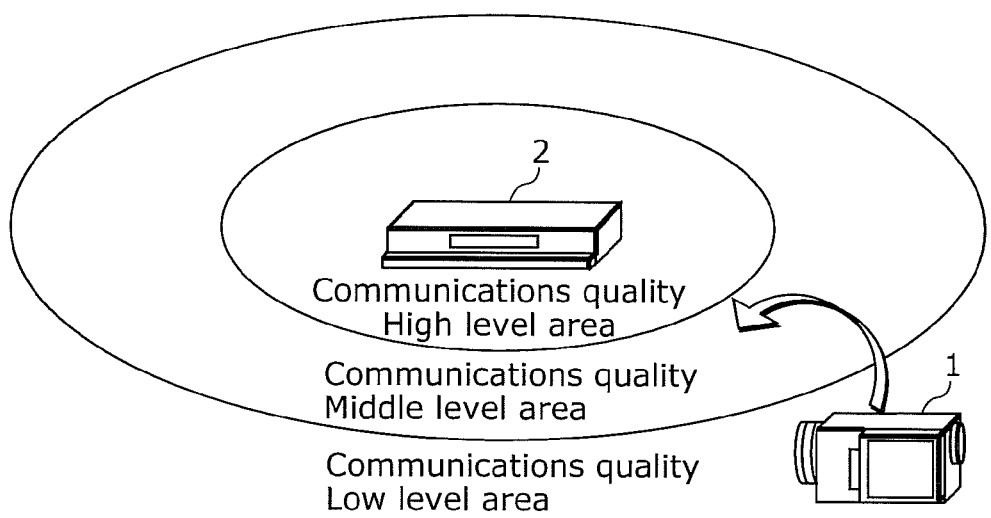
FIG. 1 shows a structure of a wireless communication system according to Embodiment 1 of the present invention

FIG. 1 shows a structure of the wireless communication system according to Embodiment 1 of the present invention. The wireless communication system in FIG. 1 includes a wireless communications apparatus 1 and a recording apparatus 2.

The wireless communications apparatus 1 transmits to the recording apparatus 2 data recorded on the recording medium via wireless communications. For example, the wireless communications apparatus 1 may be a digital camcorder with wireless communications capabilities as shown in FIG. 1. It is noted that the wireless communications apparatus 1 may also be a portable device, such as a digital still camera, a cellular phone, a personal digital assistant (PDA), and a notebook PC.

The recording apparatus 2 records the data transmitted from the wireless communications apparatus 1 via wireless communications. For example, the recording apparatus 2 may be a hard disc recorder as shown in FIG. 1. It is noted that any appliance with data recording and wireless communications capabilities may be the recording apparatus 2. Thus a PC can be the recording apparatus 2. Furthermore, examples of the recording apparatus 2 include, but not limited to, a stationary appliance. The recording apparatus 2 may be a portable appliance, such as a digital camcorder, a digital still camera, a cellular phone, a PDA, or a notebook PC.

Here the technologies used for wireless communications between the wireless communications apparatus 1 and the recording apparatus 2 include Bluetooth and the ultra wide band (UWB).

Moreover, as shown in FIG. 1, a shorter physical distance between the wireless communications apparatus 1 and the recording apparatus 2 provides higher quality of wireless communications (hereinafter referred to as communications quality). In other words, the closer the wireless communications apparatus 1 is to the recording apparatus 2, the higher communications quality is.

Here the communications quality stands for a degree of good communications such as, for example, a field intensity in wireless communications, a throughput, and occurrence frequency of communications errors. Higher communications quality also means better and more stable communications. In other words, a higher field intensity in wireless communications, a faster throughput, or less frequent communications errors make the communications quality higher. Specific examples of the communications quality are a Received Signal Strength Indicator (RSSI), a Physical Layer (PHY) rate, and a Packet Error Rate (PER).

Described next is a structure of the wireless communications apparatus 1.

Figure 2:
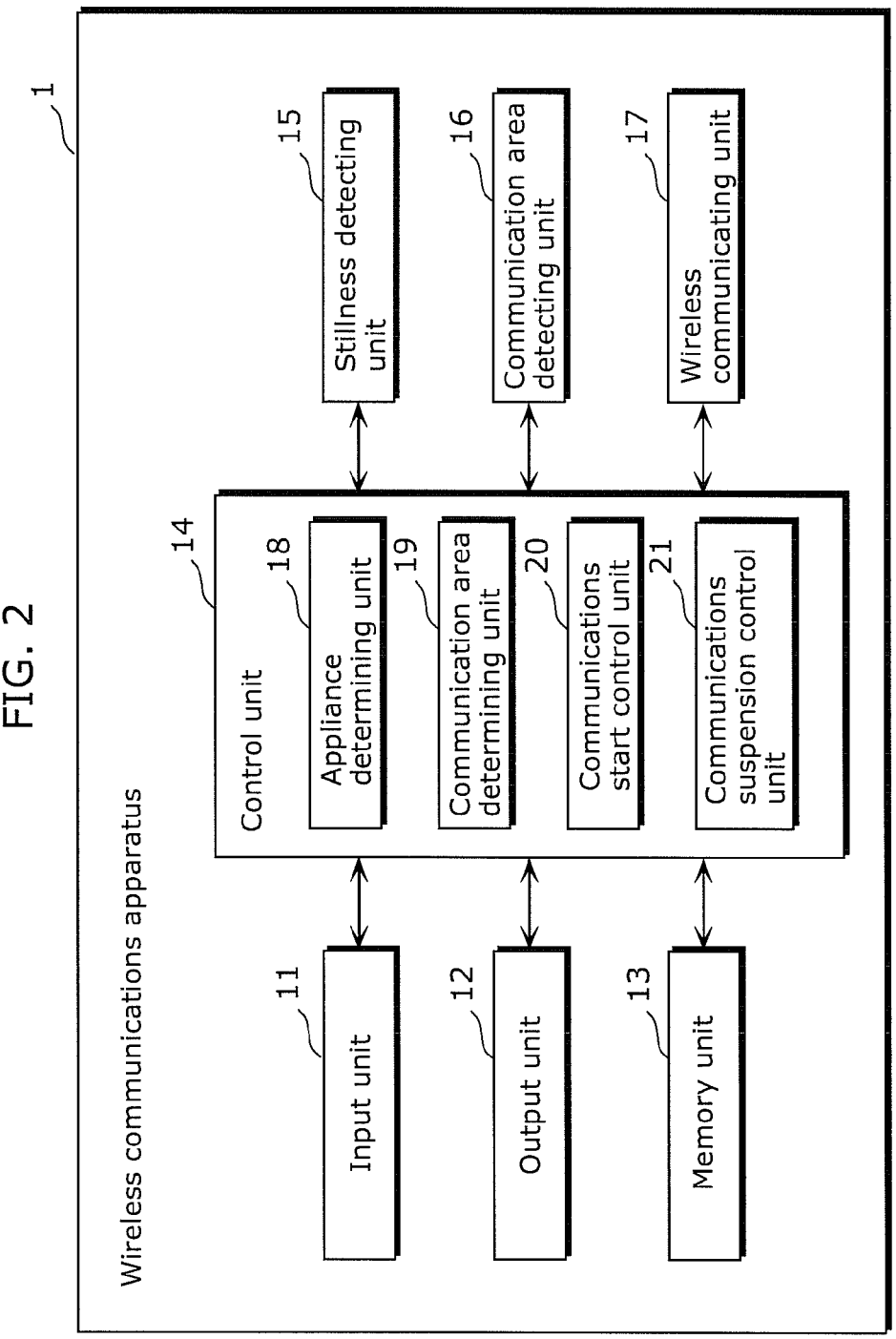
FIG. 2 shows a block diagram of a wireless communications apparatus according to Embodiment 1 of the present invention.

FIG. 2 shows a block diagram of the wireless communications apparatus 1. The wireless communications apparatus 1 shown in FIG. 2 includes an input unit 11, an output unit 12, a memory unit 13, a control unit 14, a stillness detecting unit 15, a communication area detecting unit 16, and a wireless communicating unit 17.

The input unit 11, such as an operating button, an operating switch, and a touch panel, receives a user operation.

The output unit 12, such as a monitor and a speaker, outputs an image, video, and audio outside.

The memory unit 13 stores and saves electronic data (hereinafter referred to as data) including image data and video data obtained by an imaging unit (not shown) included in the wireless communications apparatus 1. For example, the memory unit 13 may be a recording unit, included in the wireless communications apparatus 1, such as a hard disc drive and a nonvolatile memory. Examples of the memory unit 13 include, but not limited to, a recording medium in the wireless communications apparatus 1. The memory unit 13 may be a recording medium detachable from the wireless communications apparatus 1. For example, the memory unit 13 may be either an optical disc such as a compact disc (CD), a digital versatile disc (DVD), and a Blu-ray disc (BD), or a nonvolatile memory detachable from the wireless communications apparatus 1 such as a memory card and a USB memory. Furthermore, the memory unit 13 may be a combination of the recording unit included in the wireless communications apparatus 1 and the recording medium detachable from the wireless communications apparatus 1.

The stillness detecting unit 15; namely an acceleration sensor, detects whether or not the wireless communications apparatus 1 remains still or is moving.

The stillness detecting unit 15 may include: a timer which obtains the RSSI at a predetermined time period using the RSSI; and a counter which obtains the RSSI for a predetermined number of times, and may detect stillness by determining whether or not a variation in an RSSI value in a predetermined period is within a predetermined range.

The stillness detecting unit 15 may also detect stillness, via a touch sensor, by determining whether or not the user is touching the wireless communications apparatus 1.

The stillness detecting unit 15 may detect stillness, via a projection switch, by determining whether or not the projection switch is pressed.

The communication area detecting unit 16 detects a communication area found in a wireless serviceable area lying between the wireless communications apparatus 1 and the recording apparatus 2. Then the communication area detecting unit 16 notifies the control unit 14 of the detection result. In the case where there are two or more appliances which can wirelessly communicate with the wireless communications apparatus 1, the communication area detecting unit 16 detects a communication area, for each of the apparatuses, lying between each appliance and the wireless communications apparatus 1.

The wireless communicating unit 17 transmits the data, to be recorded on the memory unit 13, to the recording apparatus 2 via wireless communications. The wireless communicating unit 17 starts to transfer the data, to be recorded on the memory unit 13, to the recording apparatus 2 in the case where (i) a communication area determining unit 19 determines that the wireless communications apparatus 1 is in a predetermined communication area and (ii) the stillness detecting unit 15 determines that the wireless communications apparatus 1 remains still.

The control unit 14 has a control over the wireless communications apparatus 1. The control unit 14 includes an appliance determining unit 18, the communication area determining unit 19, a communications start control unit 20, and a communications suspension control unit 21.

The appliance determining unit 18 determines whether or not the recording apparatus 2 is a previously-designated appliance (hereinafter referred to a designated appliance). Here the designated appliance is one of an appliance authorized by the wireless communications apparatus 1, an appliance (for example, a recording apparatus with a data recording capability) having a designated attribute (function), and an appliance having a designated model number.

In the case where there are two or more appliances which can wirelessly communicate with the wireless communications apparatus 1, the appliance determining unit 18 determines for each of the appliances whether or not the appliance is the designated appliance. In the case where there are two or more designated appliances which can wirelessly communicate with the wireless communications apparatus 1, the appliance determining unit 18 also determines one of the appliances as the appliance at the destination of data. Here the determined appliance (i) is detected from among the appliances found in a predetermined communication area by the communication area determining unit 19, and (ii) is detected by the communication area detecting unit 16 as the closest appliance to the wireless communications apparatus 1. Here the wireless communicating unit 17 transmits data to the appliance determined by the appliance determining unit 18.

The communication area determining unit 19 determines whether or not the communication area detected by the communication area detecting unit 16 is one of the following: a communication area having a threshold value equal to HIGH or higher (Communications quality HIGH), an communication area having a threshold value smaller than the threshold value HIGH and equal to a threshold value MIDDLE or higher (Communications quality MIDDLE), and a communication area having a threshold value smaller than the threshold value MIDDLE (Communications quality LOW). In the Communications quality HIGH, variations of communications quality do not affect stable transfer of the wireless data. Specifically, in the communications quality, the wireless communications apparatus 1 can achieve stable wireless data transmission even though the wireless communications apparatus 1 is moving. In the Communications quality MIDDLE, the wireless communications apparatus 1 achieves stable wireless data transmission as far as the wireless communications apparatus 1 remains still. In the Communications quality LOW, the wireless communications apparatus 1 could fail to achieve stable wireless data transmission even though the wireless communications apparatus 1 remains still.

In other words, the communication area determining unit 19 determines the distance between the wireless communications apparatus 1 and the recording apparatus 2. For example, the communication area determining unit 19 determines whether the wireless communications apparatus 1 is in one of a HIGH-level communication area (Communications quality HIGH), a MIDDLE-level communication area (Communications quality MIDDLE), and a LOW-level communication area (Communications quality LOW).

The communications start control unit 20 controls the start of the wireless data transfer. Specifically, the communications start control unit 20 causes the wireless communicating unit 17 to transfer the data, to be recorded on the memory unit 13, to the recording apparatus 2 in the case where (i) the communication area detecting unit 16 determines that the wireless communications apparatus 1 is either in the MIDDLE-level communication area or in the HIGH-level communication area, and (ii) the stillness detecting unit 15 detects that the wireless communications apparatus 1 remains still.

The communications suspension control unit 21 controls the suspension of the wireless data transfer. Specifically, while the wireless communicating unit 17 is transmitting the data, the communications suspension control unit 21 sends a warming to the user via the output unit 12 the data, and suspends the transmission in the case where (i) the stillness detecting unit 15 detects that the wireless communications apparatus 1 is moving, and (ii) the communication area determining unit 19 determines that the wireless communications apparatus 1 is in the MIDDLE-level communication area. Even though the stillness detecting unit 15 detects that the wireless communications apparatus 1 is moving while the wireless communicating unit 17 is transmitting the data, the communications suspension control unit 21 continues the transmission in the case where the communication area determining unit 19 determines that the wireless communications apparatus 1 is in the HIGH-level communication area. Here sending a warning is to display on the output unit 12 a warning message notifying (warning) the user of a decrease in communications quality (difficulty in stable wireless communication), and a move of wireless communications apparatus 1. The communications suspension control unit 21 may either give a warning tone via the output unit 12 in addition to the warning message, or give the warming tone only via the output unit 12 without the warning message.

The wireless communications apparatus 1 structured above automatically transmits to the recording apparatus 2 the data to be recorded on the memory unit 13 when the user moves the wireless communications apparatus 1 near the recording apparatus 2, and sets the wireless communications apparatus 1 still. Hence the wireless communications apparatus 1 according to Embodiment 1 of the present invention allows the user to start wireless data transfer from the wireless communications apparatus 1 to the recording apparatus 2 with simple operations.

Here, typically, the functions of each of the processing units included in the control unit 14 are executed by a processor, such as a central processing unit (CPU), executing a program. It is noted that some or all of the functions of each of the processing units included in the control unit 14 may be executed by a dedicated circuit (hardware).

Described next are operations of the wireless communications apparatus 1 in executing transferring and saving.

Figure 3:
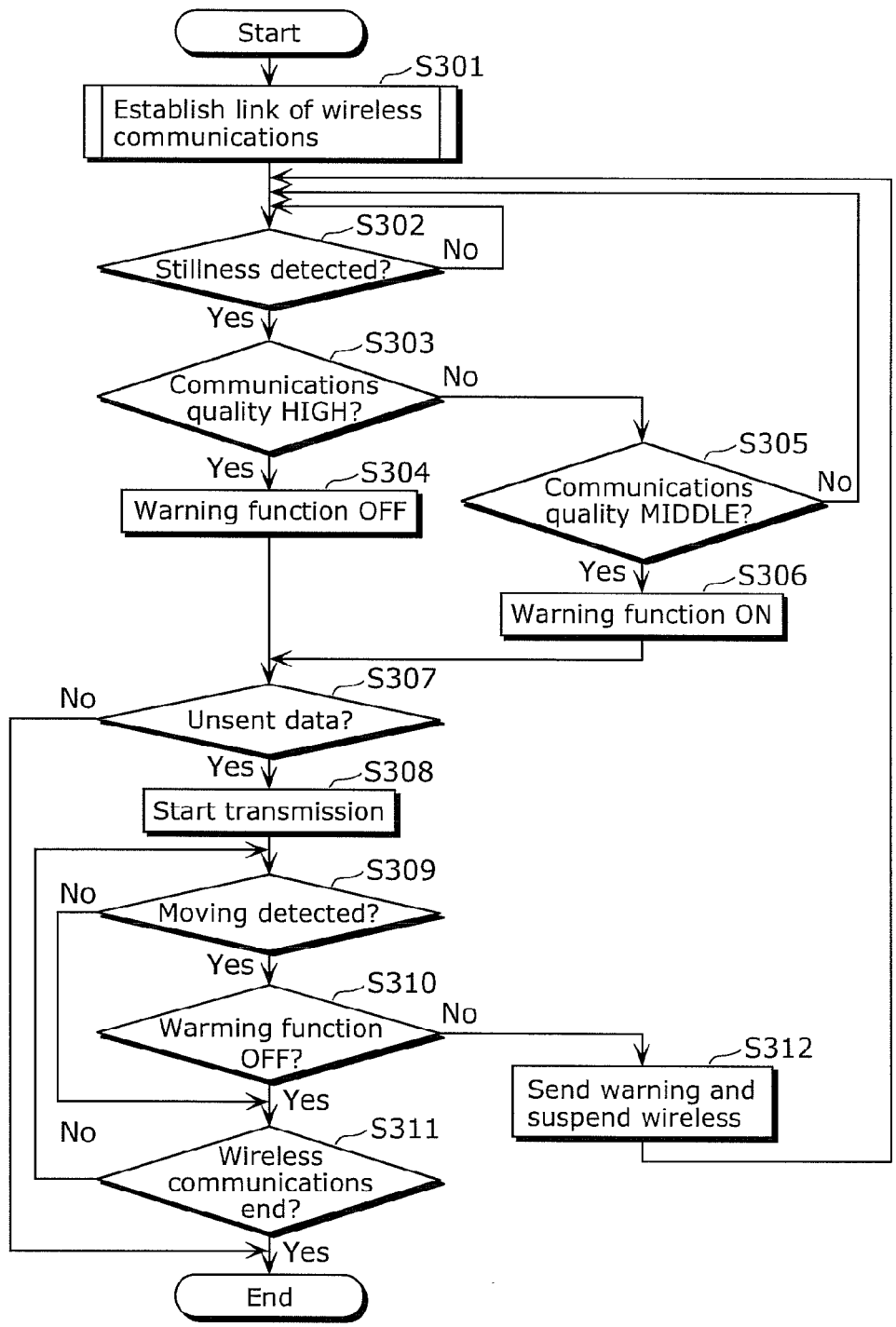
FIG. 3 is a flowchart showing data, which has been saved to the wireless communications apparatus according to Embodiment 1 of the present invention, being backed up to a recording medium.

FIG. 3 is a flowchart showing a flow of operations on the wireless communications apparatus 1 when the wireless communications apparatus 1 backs up the data saved thereto to the recording medium 2.

First the wireless communications apparatus 1 establishes a wireless communications link to the recording apparatus 2 (S301).

Next, when the stillness detecting unit 15 detects that the wireless communications apparatus 1 remains still (S302: Yes), the communication area determining unit 19 determines whether or not the wireless communications apparatus 1 is in the HIGH-level communication area; that is, whether or not the communication area detecting unit 16 has detected the Communications quality HIGH (S303). Here the following operations are repeated at a predetermined time interval; the detection of the stillness and the moving by the stillness detecting unit 15, the detection of communications quality by the communication area detecting unit 16, and the determination of the area by the communication area determining unit 19.

When the wireless communications apparatus 1 is in the HIGH-level communication area (S303: Yes), the communication area determining unit 19 sets the warming function to OFF (S304).

When the wireless communications apparatus 1 is not in the HIGH-level communication area (S303: No), the communication area determining unit 19 determines whether or not the wireless communications apparatus 1 is in the MIDDLE-level communication area; that is, whether or not the communication area detecting unit 16 has detected the Communications quality MIDDLE (S305).

When the wireless communications apparatus 1 is in the MIDDLE-level communication area (S305: Yes), the communication area determining unit 19 sets the warming function ON (S306).

When the wireless communications apparatus 1 is in the LOW-level communication area; that is the communication area detecting unit 16 detects the Communications quality LOW (S305: No), the wireless communications apparatus 1 stands by until the stillness detecting unit 15 detects the wireless communications apparatus 1 remaining still again (S302).

After either Step S304 or Step S306, the communications start control unit 20 determines whether or not the memory unit 13 has unsent data to the recording apparatus 2 (S307). In the case where no such data is found on the memory unit 13 (S307: No), the communications start control unit 20 ends the data transfer processing.

In the case where the memory unit 13 has unsent data (S307: Yes), the communications start control unit 20 causes the wireless communicating unit 17 to start transmitting to the recording apparatus 2 the unsent data recorded on the memory unit 13 (S308).

Then in the case where the stillness detecting unit 15 detects the wireless communications apparatus 1 moving during the data transmission (S309: Yes), the communications suspension control unit 21 determines whether or not the warming function is set to OFF (S310).

When the warming function is ON (S310: No), the communications suspension control unit 21 gives the warming to the user via the output unit 12, and suspends the wireless communications executed by the wireless communicating unit 17 (S312). Then the wireless communications apparatus 1 stands by until the stillness detecting unit 15 detects the stillness of the wireless communications apparatus 1 (S302).

When either the stillness detecting unit 15 does not detect the moving during the data transmission (S309: No), or the warming function is OFF (S310: Yes), the communications suspension control unit 21 determines whether or not the wireless communications have ended (S311).

In the case where the wireless communications have not ended (S311: No), the communications suspension control unit 21 returns to the processing in Step S309. In the case where the wireless communications have ended (S311: Yes), the data transfer processing ends.

It is noted that the processing including Steps S309 to S311 is repeated at a predetermined time interval.

As described above, the wireless communications apparatus 1 in the present invention successfully backs up unsent data saved to the wireless communications apparatus 1 on the recording apparatus with simple operations: The user (i) moves the wireless communications apparatus 1 closer to the recording apparatus 2 until the wireless communications apparatus 1 is in a communication area in which excellent communications quality (the Communications quality HIGH or the Communications quality MIDDLE) is secured, and (ii) sets the wireless communications apparatus 1 still. Hence a user unfamiliar with electronic appliances can easily back up the data.

When the user moves the wireless communications apparatus 1 during the data transfer, furthermore, the wireless communications apparatus 1 in the present invention suspends the data transfer until the wireless communications apparatus 1 remains still again. This makes possible preventing a failure of the file system in the recording apparatus 2.

Even though the user moves the wireless communications apparatus 1 during the data transfer, the wireless communications apparatus 1 in the present invention does not suspend the data transfer in the case where the wireless communications apparatus 1 is in a communication area in which excellent communications quality is secured. This makes possible reducing an increase in data transfer time caused by unnecessary interruptions of the data transfer.

Described next are operations of the wireless communications apparatus 1 when there are two or more appliances which can wirelessly communicate with the wireless communications apparatus 1.

Figure 4:
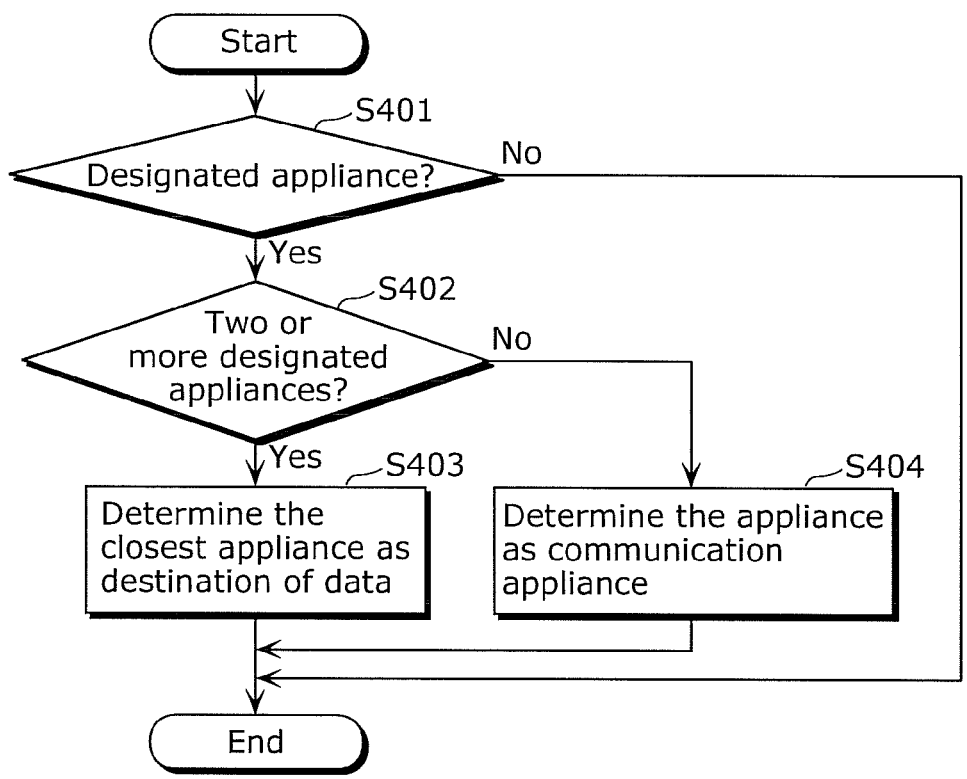
FIG. 4 is a flowchart showing a process of determining a designated appliance by the wireless communications apparatus according to Embodiment 1 of the present invention.

FIG. 4 is a flowchart showing a flow of the processing in Step S301 described above.

First, the appliance determining unit 18 determines whether or not the recording apparatus 2 is a designated appliance (S401). When there are two or more appliances which can wirelessly communicate with the wireless communications apparatus 1, the appliance determining unit 18 determines, for each of the appliances, whether or not each appliance is a designated appliance.

Next, when there are two or more designated appliances which can wirelessly communicate with the wireless communications apparatus 1 (S402: Yes), the appliance determining unit 18 determines one of the designated appliances as the appliance at the destination of data. Here the determined appliance is detected by the communication area detecting unit 16 as the closest appliance to the wireless communications apparatus 1 (S403).

When there is one designated appliance which can wirelessly communicate with the wireless communications apparatus 1 (S402: No), the appliance determining unit 18 determines the designated appliance as the appliance at the destination of data (S404).

In Steps S403 and S404, the wireless communications apparatus 1 executes the processing, in Step S302 of FIG. 3, on the designated appliance determined by the appliance determining unit 18 as the appliance at the destination of data.

When an appliance which can wirelessly communicate with the wireless communications apparatus 1 is not the designated appliance (S401: No), the wireless communications apparatus 1 ends the data transfer.

As described above, the wireless communications apparatus 1 according to Embodiment 1 of the present invention wirelessly transfers the data only to a previously-designated appliance. This prevents the wireless communications apparatus 1 from inadvertently transmitting the data to an unintended appliance for the user. For example, the wireless communications apparatus 1 carries out successful wireless transfer of the data to the recording apparatus 2 (a HDD recorder) even though there are other appliances (a TV and a game console) having wireless communications capabilities near the recording apparatus 2.

In the case where there are two or more appliances as destinations of data, the user can select an appliance as the destination of the data by simply placing the wireless communications apparatus 1 in the present invention most closely to the appliance at the destination of data.

It is noted that the order of processing shown in FIGS. 3 and 4 is an example. The order may be changed.

For example, the wireless communications apparatus 1 determines (S303 and S305) whether or not the wireless communications apparatus 1 is in the HIGH-level communication area or in the MIDDLE-level communication area, immediately after detecting the stillness of the wireless communications apparatus 1 (immediately after S302). Instead, the wireless communications apparatus 1 may determine (i) whether or not the communication area has the Communications quality MIDDLE or higher immediately after the detection of the stillness of the wireless communications apparatus 1 (immediately after S302), and, after the start of the data transmission (after S308), (ii) whether or not the wireless communications apparatus 1 is in the HIGH-level communication area or in the MIDDLE-level communication area.

According to the above description, the communications suspension control unit 21 sends a notification of a warning and suspends the wireless data transmission together in Step S312. Instead, the communications suspension control unit 21 may either only send the notification of a warning to the user or only suspend wireless data transmission.

[Embodiment 2]

Embodiment 2 of the present invention exemplifies the case where transfer and display are executed. Specifically, a wireless communications apparatus 1a according to Embodiment 2 of the present invention displays a list of content data and transmits only the data which the user selects when starting wireless transmission.

Described first is a wireless communication system according to Embodiment 2 of the present invention.

Figure 5:
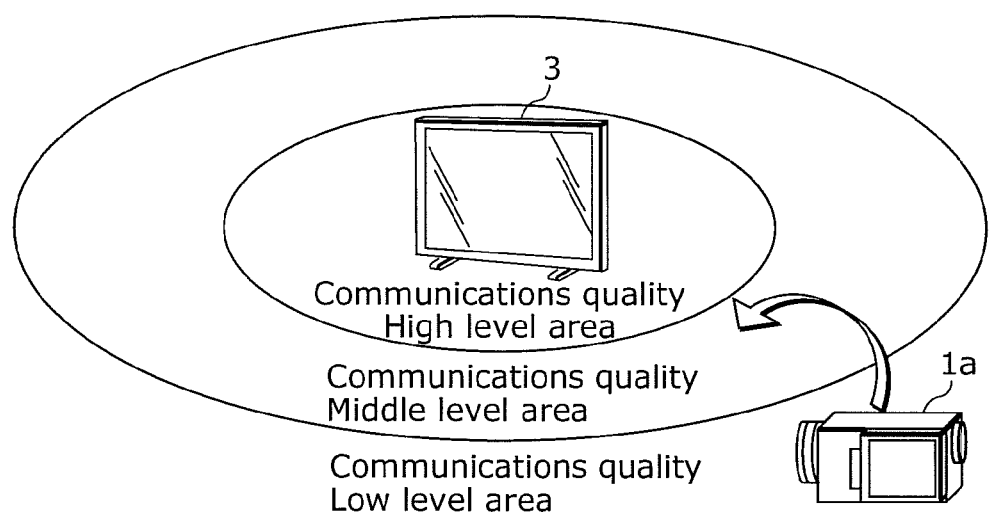
FIG. 5 shows a structure of a wireless communication system according to Embodiment 2 of the present invention.

FIG. 5 shows a structure of the wireless communication system according to Embodiment 2 of the present invention. The wireless communication system in FIG. 5 includes the wireless communications apparatus 1a and a displaying apparatus 3.

Via wireless communications, the wireless communications apparatus 1a transmits to the displaying apparatus 3 data recorded on the recording medium. For example, the wireless communications apparatus 1a may be a digital camcorder with wireless communications capabilities as shown in FIG. 5. It is noted that the wireless communications apparatus 1 may also be a portable device, such as a digital still camera, a cellular phone, a PDA, and a notebook PC.

The displaying apparatus 3 displays the data transmitted from the wireless communications apparatus 1a via wireless communications. The displaying apparatus 3 is, for example, a digital TV as shown in FIG. 5. It is noted that any appliance with data displaying and wireless communications capabilities may be the displaying apparatus 3. Thus a PC can be the displaying apparatus 3. Examples of the displaying apparatus 3 include, but not limited to, a stationary appliance. The displaying apparatus 3 may be a portable device, such as a digital still camera, a cellular phone, a PDA, and a notebook PC.

Figure 6:
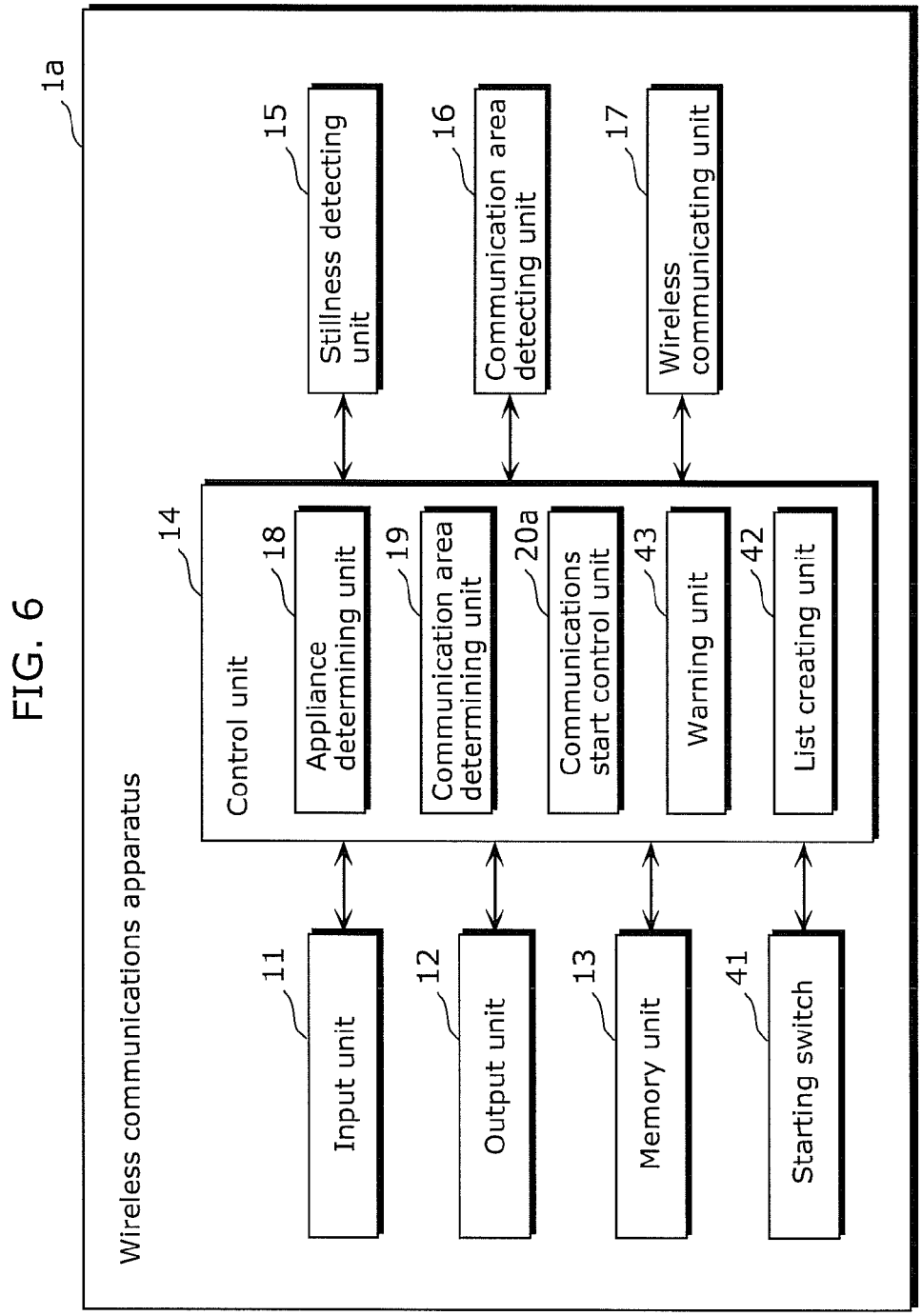
FIG. 6 shows a block diagram of the wireless communications apparatus according to Embodiment 2 of the present invention.

FIG. 6 shows a block diagram of the wireless communications apparatus 1a according to Embodiment 2 of the present invention. It is noted that the same constituent features as those in FIG. 2 share the same numerical references. Thus description thereof shall be omitted.

In addition to the structure of wireless communications apparatus 1 in FIG. 2, the wireless communications apparatus 1a in FIG. 6 includes a starting switch 41. Moreover, the control unit 14 includes a list creating unit 42. Furthermore, a warning unit 43 replaces the communications suspension control unit 21. A communications start control unit 20a and the communications start control unit 20 differ function-wise.

The starting switch 41 controls the start of data transmission of wireless communications. The user turns on or off the starting switch 41. The starting switch 41 may be, for example, a toggle switch or a push button switch. Furthermore, the on or off of the starting switch 41 may be entered in the input unit 11.

The communications start control unit 20a controls the start of wireless data transfer. Specifically, the communications start control unit 20a causes the wireless communications unit 17 to start to transfer data recorded on the memory unit 13 in the case where (i) the communication area determining unit 19 determines that the wireless communications apparatus 1a is either in the HIGH-level communication area or in the MIDDLE-level communication area, (ii) the stillness detecting unit 15 determines that the wireless communications apparatus 1a remains still, and (iii) the starting switch 41 is on.

During the wireless data transfer, the warning unit 43 sends the user a warning via the output unit 12. Specifically, the warning unit 43 sends the user the warning via the output unit 12 in the case where (i) the stillness detecting unit 15 detects the wireless communications apparatus 1a moving, and (ii) the communication area detecting unit 16 detects the Communications quality MIDDLE. Here sending a warning is to display on the output unit 12 a warning message notifying (warning) the user of a decrease in communications quality (difficulty in stable wireless communication), and a move of wireless communications apparatus 1a. The warning unit 43 may either give a warning tone via the output unit 12 in addition to the warning message, or give the warming tone only via the output unit 12 without the warning message.

The list creating unit 42 creates a content list which is a list of content data recorded on the memory unit 13. The output unit 12 displays the content list created by the list creating unit 42 in the case where (i) the communication area determining unit 19 determines that the wireless communications apparatus 1a is either in the HIGH-level communication area or in the MIDDLE-level communication area, and (ii) the starting switch 41 is on.

Described next are operations of the wireless communications apparatus 1a.

Figure 7:
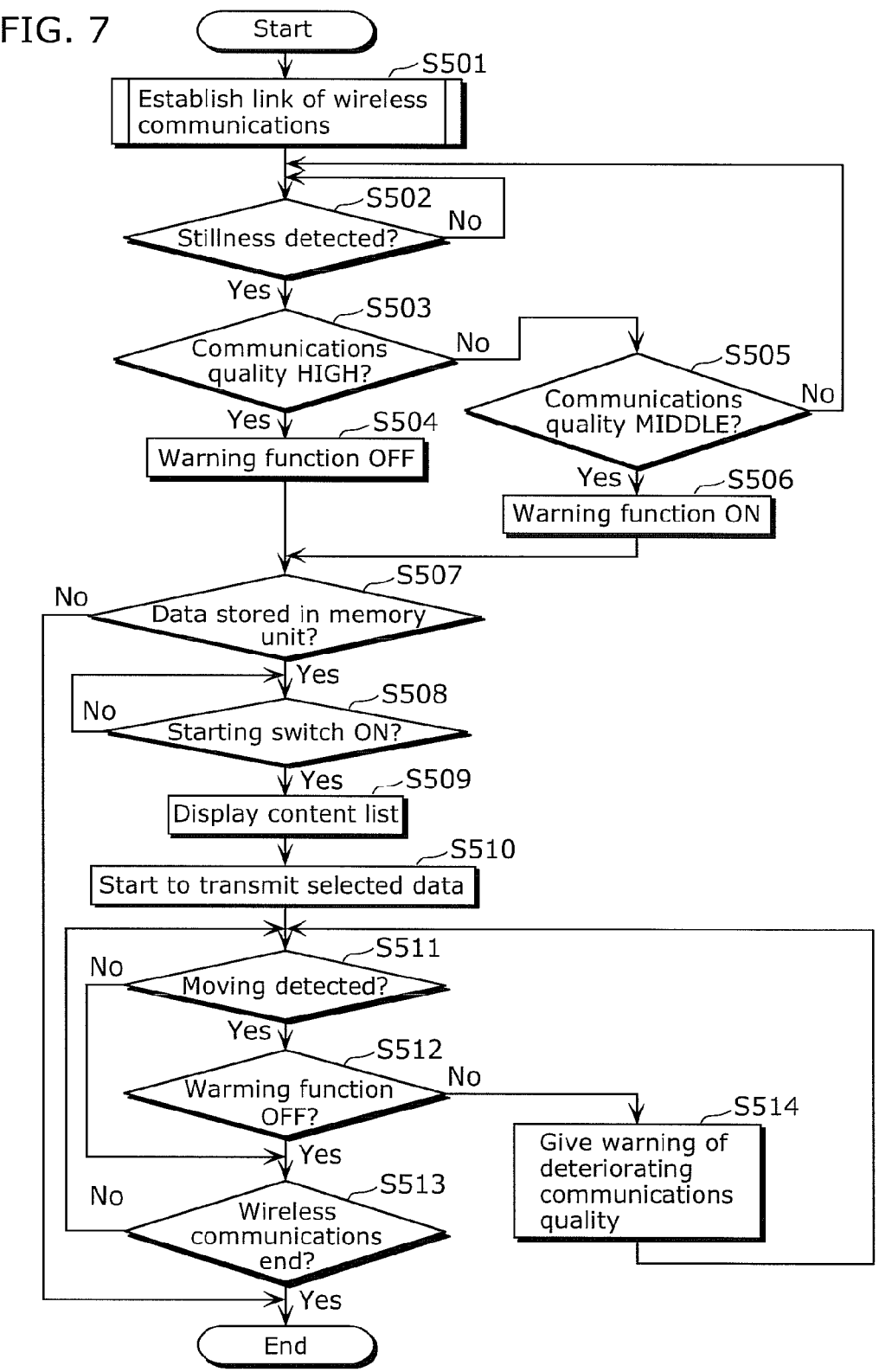
FIG. 7 is a flowchart showing data, which has been saved to the wireless communications apparatus according to Embodiment 2 of the present invention, being displayed on a display apparatus.

FIG. 7 is a flowchart showing data, which has been saved to the wireless communications apparatus 1a, to be transferred and displayed on the displaying apparatus 3. It is noted that the processing of Steps S501 to S506 and of Steps S511 to S513 shown in FIG. 7 is similar to that of Steps S301 to S306 and of Steps S309 to S311 shown in FIG. 3. The processing of Steps S507 to S510 differs from that in FIG. 3.

First the wireless communications apparatus 1a establishes a wireless communications link to the displaying apparatus 3 (S501).

Next, when the stillness detecting unit 15 detects that the wireless communications apparatus 1a remains still (S502: Yes), the communication area determining unit 19 determines whether or not the wireless communications apparatus 1a is in the HIGH-level communication area; that is, whether or not the communication area detecting unit 16 has detected the Communications quality HIGH (S503).

When the wireless communications apparatus 1a is in the HIGH-level communication area (S503: Yes), the communication area determining unit 19 sets the warming function to OFF (S504).

When the wireless communications apparatus 1a is not in the HIGH-level communication area (S503: No), the communication area determining unit 19 determines whether or not the wireless communications apparatus 1a is in the MIDDLE-level communication area; that is, whether or not the communication area detecting unit 16 has detected the Communications quality MIDDLE (S505).

When the wireless communications apparatus 1a is in the MIDDLE-level communication area (S505: Yes), the communication area determining unit 19 sets the warming function to ON (S506).

When the wireless communications apparatus 1a is in the LOW-level communication area (S505: No), the wireless communications apparatus 1a stands by until the stillness detecting unit 15 detects the wireless communications apparatus 1a remaining still again (S502).

After either Step S504 or Step S506, the communications start control unit 20a determines whether or not the memory unit 13 stores data in the memory unit 13 (S507). In the case where no such data is stored in the memory unit 13 (S507: No), the data transfer processing ends.

In the case where the memory unit 13 stores the data (S507: Yes), the communications start control unit 20a determines whether or not the starting switch 41 is ON (S508).

When the user sets the starting switch 41 to ON (S508: Yes), the list creating unit 42 creates a content list which is a list of content data recorded on the memory unit 13. Next the output unit 12 displays the content list created by the list creating unit 42 (S509). It is noted that the list creating unit 42 may create the content list with any given timing as far as the timing is with Step S509 or before.

Then the user uses the input unit 11 to select content data, which the user desires to transfer and display, from the content list displayed by the output unit 12. The communications start control unit 20a causes the wireless communications unit 17 to start to wirelessly transmit the user-selected content data to the displaying apparatus 3 (S510).

Then in the case where the stillness detecting unit 15 detects the wireless communications apparatus 1a moving during the data transmission (S511: Yes), the warning unit 43 determines whether or not the warming function is set to OFF (S512).

When the warming function is ON (S512: No), the warning unit 43 gives the warning to the user via the output unit 12 (S514). Then the warning unit 43 proceeds to the processing in Step S511.

When either the stillness detecting unit 15 does not detect the moving (S511: No), or the warming function is OFF (S512: Yes), the warning unit 43 determines whether or not the wireless communications have ended (S513).

In the case where the wireless communications have not ended (S513: No), the warning unit 43 returns to the processing in Step S511. In the case where the wireless communications have ended (S513: Yes), the data transfer processing ends.

It is noted that the processing including Steps S511 to S513 is repeated at a predetermined time interval.

As described above, the wireless communications apparatus 1a according to Embodiment 2 of the present invention successfully displays the list of the content data recorded on the memory unit 13 with simple operations: The user (i) moves the wireless communications apparatus 1a closer to the recording apparatus 2 until the wireless communications apparatus 1a is in a communication area (in other words, the HIGH-level communication area or the MIDDLE-level communication area) in which excellent communications quality (the Communications quality HIGH or the Communications quality MIDDLE) is secured, and (ii) sets the wireless communications apparatus 1a still. Simply selecting from the list the content data to be displayed on the displaying apparatus 3, the user can display any given content data on the displaying apparatus 3. Hence a user unfamiliar with electronic appliances can easily transfer and display, on the displaying apparatus 3, the electronic data saved to the wireless communications apparatus 1a.

Furthermore, the wireless communications apparatus 1a in the present invention sends a warning to the user in the case where the wireless communications apparatus 1a moves while transferring the data. This makes possible preventing the displaying apparatus 3 from failing to appropriately display the content data due to the failure of appropriate data transfer to the displaying apparatus 3.

Even though the user moves the wireless communications apparatus 1a in the present invention during the data transfer, the wireless communications apparatus 1a does not send the warning in the case where excellent communications quality is secured (the wireless communications apparatus 1a is in the HIGH-level communication area). This prevents the wireless communications apparatus 1a from sending an unnecessary warning.

Compared with the wireless communications apparatus 1 according to the Embodiment 1, the wireless communications apparatus 1a does not suspend the data transfer because, while the wireless communications apparatus 1a is transmitting and displaying the data, (i) there is no chance of a file crush in transferring and displaying the data, and (ii) the suspension of the content display might make the user feel uncomfortable.

In the above description, the user turns the starting switch 41 on in Step S508; instead, the user may turn the starting switch 41 on before the Step S508. The wireless communications apparatus 1a may proceed to the Step S501 and the succeeding Steps shown in FIG. 7 only in the case where the starting switch 41 is on.

Moreover, in the case where a destination appliance is the recording apparatus 2, the wireless communications apparatus 1a may execute at least one of the control via the starting switch 41 (S508) and the display of the content list; namely, the data list (S509 and S510).

[Embodiment 3]

A wireless communications apparatus 1b according to Embodiment 3 of the present invention displays on the displaying apparatus 3 a list of content data to be recorded on the memory unit 13. Based on the user operations on the displaying apparatus 3, the wireless communications apparatus 1b starts wireless data transfer. It is noted that a structure of a wireless communication system according to Embodiment 3 is similar to that shown in FIG. 5, for example.

Figure 8:
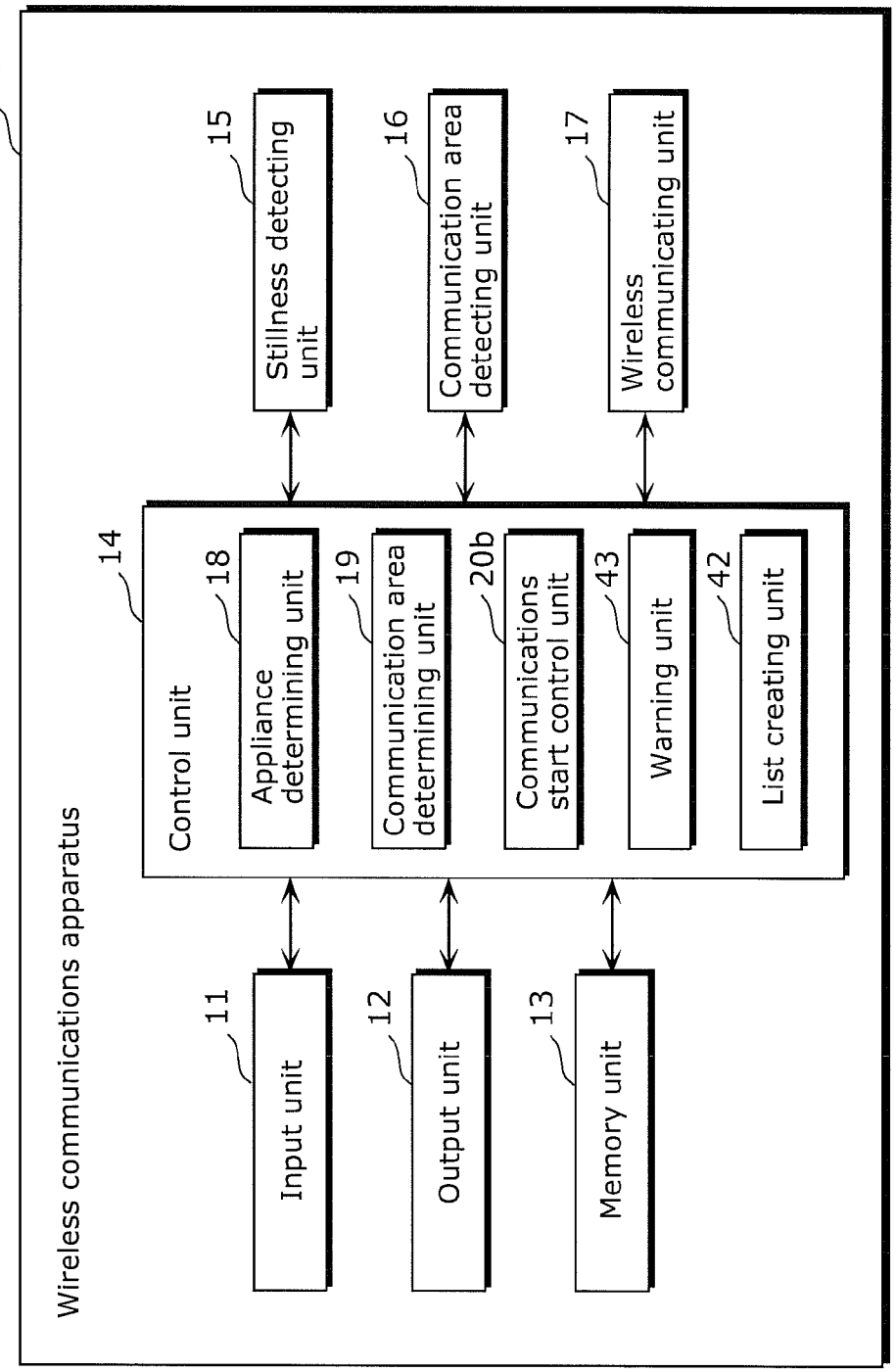
FIG. 8 shows a block diagram of a wireless communications apparatus according to Embodiment 3 of the present invention.

FIG. 8 shows a block diagram illustrating a structure of the wireless communications apparatus 1b according to Embodiment 3 of the present invention. It is noted that the same constituent features as those in FIGS. 2 and 6 share the same numerical references. Thus description thereof shall be omitted.

In addition to the structure of wireless communications apparatus 1 in FIG. 2, the wireless communications apparatus 1b in FIG. 8 has the list creating unit 42 in the control unit 14. Furthermore, the warning unit 43 replaces the communications suspension control unit 21. A communications start control unit 20b and the communications start control unit 20 differ function-wise. It is noted that the functions of the list creating unit 42 and the warning unit 43 in Embodiment 3 are similar to those in Embodiment 2.

The communications start control unit 20b causes the wireless communications unit 17 to wirelessly transmit, to the displaying apparatus 3, a content list created by the list creating unit 42. Based on information transmitted from the displaying apparatus 3, the communications start control unit 20b selects data to be transmitted to the displaying apparatus 3.

Figure 9:
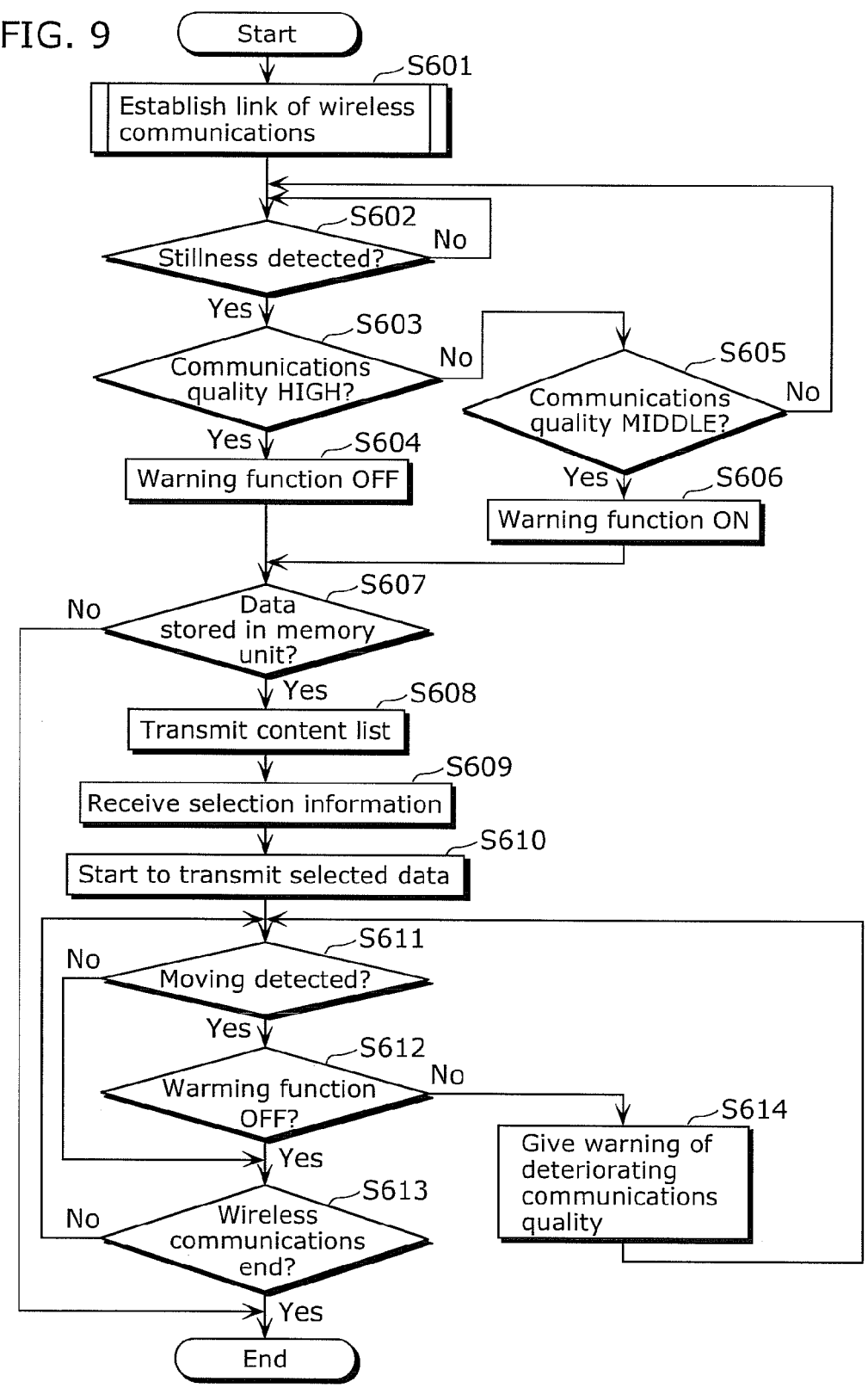
FIG. 9 is a flowchart showing data, which has been saved to the wireless communications apparatus according to Embodiment 3 of the present invention, being displayed on a display apparatus.

FIG. 9 is a flowchart showing the data saved to the wireless communications apparatus 1b being transferred and displayed to the displaying apparatus 3. It is noted that the processing of Steps S601 to S607 and of Steps S611 to S614 shown in FIG. 9 is similar to that of Steps S501 to S507 and of Steps S511 to S514 shown in FIG. 7. The processing of Steps S608 to S610 differs from that in FIG. 7.

First the wireless communications apparatus 1b establishes a wireless communications link to the displaying apparatus 3 (S601).

Next, when the stillness detecting unit 15 detects that the wireless communications apparatus 1b remains still (S602: Yes), the communication area determining unit 19 determines whether or not the wireless communications apparatus 1b is in the HIGH-level communication area; that is, whether or not the communication area detecting unit 16 has detected the Communications quality HIGH (S603).

When the wireless communications apparatus 1b is in the HIGH-level communication area (S603: Yes), the communication area determining unit 19 sets the warming function to OFF (S604).

When the wireless communications apparatus 1b is not in the HIGH-level communication area (S603: No), the communication area determining unit 19 determines whether or not the wireless communications apparatus 1b is in the MIDDLE-level communication area; that is, whether or not the communication area detecting unit 16 has detected the Communications quality MIDDLE (S605).

When the wireless communications apparatus 1b is in the MIDDLE-level communication area (S605: Yes), the communication area determining unit 19 sets the warming function to ON (S606).

When the wireless communications apparatus 1b is in the LOW-level communication area (S605: No), the wireless communications apparatus 1b stands by until the stillness detecting unit 15 detects the wireless communications apparatus 1b remaining still again (S602).

After either Step S604 or Step S606, the communications start control unit 20b determines whether or not the memory unit 13 stores data in the memory unit 13 (S607). In the case where no such data is stored in the memory unit 13 (S607: No), the data transfer processing ends.

In the case where the memory unit 13 stores the data (S607: Yes), the list creating unit 42 creates a content list which is a list of the content data recorded on the memory unit 13. Then the wireless communications unit 17 wirelessly transmits, to the displaying apparatus 3, the content list created by the list creating unit 42 (S608). It is noted that the list creating unit 42 may create the content list with any given timing as far as the timing is with Step S609 or before.

The displaying apparatus 3 receives the content list transmitted by the wireless communications unit 17, and displays the received content list to the user. From the content list displayed on the displaying apparatus 3, the user selects content which the user desires to transfer and display on the displaying apparatus 3. For example, the user may use a remote control for the displaying apparatus 3 to select the transferred and displayed content. Then the displaying apparatus 3 transmits to the wireless communications apparatus 1b selection information indicating the content selected by the user.

The wireless communications unit 17 receives the selection information transmitted by the displaying apparatus 3 (S609). The communications start control unit 20b causes the wireless communications unit 17 to start to wirelessly transmit, to the displaying apparatus 3, the content data indicated with the selection information (S610).

Then in the case where the stillness detecting unit 15 detects the wireless communications apparatus 1b moving during the data transmission (S611: Yes), the warning unit 43 determines whether or not the warming function is set to OFF (S612).

When the warming function is ON (S612: No), the warning unit 43 gives a warning to the user via the output unit 12 (S614). Then the warning unit 43 proceeds to the processing in Step S611.

When either the stillness detecting unit 15 does not detect the moving (S611: No), or the warming function is OFF (S612: Yes), the warning unit 43 determines whether or not the wireless communications have ended (S613).

In the case where the wireless communications have not ended (S613: No), the warning unit 43 returns to the processing in Step S611. In the case where the wireless communications have ended (S613: Yes), the data transfer processing ends.

As described above, the wireless communications apparatus 1b according to Embodiment 3 of the present invention successfully displays the list of the content data recorded on the memory unit 13 with simple operations: The user (i) moves the wireless communications apparatus 1b closer to the recording apparatus 2 until the wireless communications apparatus 1b is in a communication area (in other words, the HIGH-level communication area or the MIDDLE-level communication area) in which excellent communications quality (the Communications quality HIGH or the Communications quality MIDDLE) is secured, and (ii) sets the wireless communications apparatus 1b still. Simply selecting from the list the content data to be displayed on the displaying apparatus 3, the user can display any given content data on the displaying apparatus 3. Hence a user unfamiliar with electronic appliances can easily transfer and display, on the displaying apparatus 3, the electronic data saved to the wireless communications apparatus 1b.

After displaying the content list on the displaying apparatus 3, the wireless communications apparatus 1b according to Embodiment 3 of the present invention starts the wireless data transfer based on the user operations on the displaying apparatus 3. This allows the user to start the wireless data transfer, freeing the user from complicated operations on the wireless communications apparatus 1b. Specifically, the following simple operations enable the user to start the transfer and the display: The user (i) moves the wireless communications apparatus 1b closer to the displaying apparatus 3, and (ii) operates a remote control for the displaying apparatus 3 (a TV, for example) to display content. Furthermore, the content list is displayed on a large screen, such a TV, instead of a small screen of a displaying unit which a digital camcorder has. This makes it easy for the user to select the content.

It is noted that the wireless communications apparatus 1b may include the starting switch 41 as the wireless communications apparatus 1a does so in Embodiment 2. Via the starting switch 41, the wireless communications apparatus 1b may control the start of the wireless data transmission.

Moreover, the present invention may be introduced as a wireless communications apparatus having functions of either the wireless communications apparatus 1 according to Embodiment 1 or one of the wireless communications apparatuses 1a according to Embodiment 2 and the wireless communications apparatuses 1b according to Embodiment 3.

In addition, the present invention may also be introduced in a combination of at least some functions of the wireless communications apparatuses 1, 1a, and 1b according to Embodiments 1 to 3 and the modifications thereof.

[Industrial Applicability]

The present invention is applicable to wireless communications apparatuses, and in particular, to mobile AV appliances including a digital still camera and a digital video camera.

[Reference Signs List]

1, 1a, and 1b Wireless communications apparatus
2. Recording apparatus
3. Displaying apparatus
11. Input unit
12. Output unit
13. Memory unit
14. Control unit
15. Stillness detecting unit
16. Communication area detecting unit
17. Wireless communicating unit
18. Appliance determining unit
19. Communication area detecting unit
20, 20a, and 20b Communications start control unit
21. Communications suspension control unit
41 Starting switch
42. List creating unit
43. Warning unit

The invention claimed is:

1. A wireless communications apparatus which transmits, via wireless communications, data recorded on a recording medium to one or more of other appliances, said wireless communications apparatus comprising:
a communication area determining unit configured to determine whether or not said wireless communications apparatus is in a predetermined communication area;
a stillness detecting unit configured to detect whether or not said wireless communications apparatus remains still;
a wireless communications unit configured to start to transmit, via the wireless communications, the data recorded on the recording medium to the other appliance in the case where (i) said communication area determining unit determines that said wireless communications apparatus is in the predetermined communication area, and (ii) said stillness detecting unit detects that said wireless communications apparatus remains still; and
a control unit configured to:
(i) execute, while said wireless communications unit is transmitting the data, at least one of suspending the transmission and sending a warning to a user in the case where (a) said stillness detecting unit detects that said wireless communications apparatus is moving, and (b) said communication area determining unit determines that said wireless communications apparatus is in the predetermined communication area and out of a communication area smaller than the predetermined communication area; and
(ii) avoid executing, while said wireless communications unit is transmitting the data, at least one of the suspending the transmission and the sending the warning to the user in the case where (a) said stillness detecting unit detects that said wireless communications apparatus is moving, and (b) said communication area determining unit determines that said wireless communications apparatus is in the communication area smaller than the predetermined communication area.

2. The wireless communications apparatus according to claim 1, further comprising:
an appliance determining unit configured to determine whether or not the other appliance is a designated appliance which has previously been designated,
wherein said wireless communications unit is configured to start to transmit, via the wireless communications, the data recorded on the recording medium to the other appliance in the case where (i) said communication area determining unit determines that said wireless communications apparatus is in the predetermined communication area, (ii) said stillness detecting unit detects that said wireless communications apparatus remains still, and (iii) said appliance determining unit determines that the other appliance is the designated appliance.

3. The wireless communications apparatus according to claim 2,
wherein, in the case where there are two or more of the other appliances which can wirelessly communicate with said wireless communications apparatus, said communication area determining unit is configured to determine, for each of the other appliances, whether or not the other appliance is in the predetermined communication area,
said appliance determining unit is configured to (i) determine, for each of the other appliances, whether or not the other appliance is the designated appliance, and, in the case where the other appliances include the designated appliances, (ii) determine, from among the other appliances which are the designated appliances, an appliance as an other appliance at a destination of data transmission, the appliance being determined by said communication area determining unit to be found in the predetermined communication area, and to be closest to said wireless communications apparatus, and
said wireless communications unit is configured to transmit the data recorded on the recording medium to the other appliance determined by said appliance determining unit as the destination of the data transmission.

4. The wireless communications apparatus according to claim 1, further comprising
a starting switch to be operated by the user,
wherein said wireless communications unit is configured to start to transmit, via the wireless communications, the data recorded on the recording medium to the other appliance in the case where (i) said communication area determining unit determines that said wireless communications apparatus is in the predetermined communication area, (ii) said stillness detecting unit detects that said wireless communications apparatus remains still, and (iii) said starting switch is on.

5. The wireless communications apparatus according to claim 1,
wherein the other appliance is a displaying apparatus which displays the data transmitted from said wireless communications apparatus,
said wireless communications apparatus further comprises a list creating unit configured to create a list of the data recorded on the recording medium, and
in the case where (i) said communication area determining unit determines that said wireless communications apparatus is in the predetermined communication area, and (ii) said stillness detecting unit detects that said wireless communications apparatus remains still, said wireless communications unit is configured to transmit the list to the displaying apparatus via the wireless communications, and to transmit data designated by the user to the displaying apparatus, the designated data being included in the data in the list.

6. The wireless communications apparatus according to claim 5,
wherein said wireless communications unit is configured to receive information transmitted from the displaying apparatus and indicating the data designated by the user, and to transmit the data indicated in the received information to the displaying apparatus.

7. The wireless communications apparatus according to claim 1, further comprising:
a list creating unit configured to create a list of the data recorded on the recording medium;
a displaying unit configured to display the list in the case where (i) said communication area determining unit determines that said wireless communications apparatus is in the predetermined area, and (ii) said stillness detecting unit detects that said wireless communications apparatus remains still; and
an input unit configured to receive an input operation of the user,
wherein said wireless communications unit is configured to transmit data designated by the user to the other appliance via said input unit, the designated data being included in the data in the list.

8. The wireless communications apparatus according to claim 1,
wherein said communication area determining unit is configured to determine a communication area using a Received Signal Strength Indicator (RSSI).

9. The wireless communications apparatus according to claim 1,
wherein said communication area determining unit is configured to determine a communication area using a Physical Layer (PHY) rate.

10. The wireless communications apparatus according to claim 1,
wherein said communication area determining unit is configured to determine a communication area using Packet Error Rate (PER).

11. The wireless communications apparatus according to claim 1,
wherein said stillness detecting unit is configured to determine stillness using an acceleration sensor.

12. The wireless communications apparatus according to claim 1,
wherein said stillness detecting unit includes: a timer which obtains a Received Signal Strength Indicator (RSSI) at a predetermined time period using the RSSI; and a counter which obtains the RSSI for a predetermined number of times, and is configured to detect stillness by determining whether or not a variation in an RSSI value in a predetermined period is within a predetermined range.

13. The wireless communications apparatus according to claim 1,
wherein said stillness detecting unit is configured to detect stillness, via a touch sensor, by determining whether or not the user is touching said wireless communications apparatus.

14. The wireless communications apparatus according to claim 1,
wherein said stillness detecting unit is configured to detect stillness, via a projection switch, by determining whether or not the projection switch is pressed.

15. A wireless communications method used for a wireless communications apparatus transmitting, via wireless communications, data recorded a recording medium to one or more of other appliances, said method comprising:
determining whether or not the wireless communications apparatus is in a communication area;
detecting whether or not the wireless communications apparatus remains still;
starting to transmit, via the wireless communications, the data recorded on the recording medium to the other appliance in the case where (i) the wireless communications apparatus is determined to be in a predetermined area in said determining, and (ii) the wireless communications apparatus is determined to remain still in said detecting; and
controlling the wireless communications apparatus so as to:
(i) execute, while the wireless communications apparatus is transmitting the data, at least one of suspending the transmission and sending a warning to a user in the case where (a) the wireless communications apparatus is determined to be moving in said detecting, and (b) the wireless communications apparatus is determined to be in the predetermined area and out of a communication area smaller than the predetermined area; and
(ii) avoid executing, while the wireless communications apparatus is transmitting the data, at least one of the suspending the transmission and the sending the warning to the user in the case where (a) the wireless communications apparatus is determined to be moving in said detecting, and (b) the wireless communications apparatus is determined to be in the communication area smaller than the predetermined area.

16. A non-transitory computer-readable recording medium on which a program is recorded, the program being used for a wireless communications apparatus transmitting, via wireless communications, data recorded a recording medium to one or more of other appliances,
wherein the program causes a computer to execute:
determining whether or not the wireless communications apparatus is in a communication area;
detecting whether or not the wireless communications apparatus remains still;
starting to transmit, via the wireless communications, the data recorded on the recording medium to the other appliance in the case where (i) the wireless communications apparatus is determined to be in a predetermined area in said determining, and (ii) the wireless communications apparatus is determined to remain still in said detecting; and
controlling the wireless communications apparatus so as to:
(i) execute, while the wireless communications apparatus is transmitting the data, at least one of suspending the transmission and sending a warning to a user in the case where (a) the wireless communications apparatus is determined to be moving in said detecting, and (b) the wireless communications apparatus is determined to be in the predetermined area and out of a communication area smaller than the predetermined area; and
(ii) avoid executing, while the wireless communications apparatus is transmitting the data, at least one of the suspending the transmission and the sending the warning to the user in the case where (a) the wireless communications apparatus is determined to be moving in said detecting, and (b) the wireless communications apparatus is determined to be in the communication area smaller than the predetermined area.

* * * * *